US012686601B2

(12) United States Patent
Komura et al.

(10) Patent No.: US 12,686,601 B2

(45) Date of Patent: Jul. 21, 2026

(54) CONVEYANCE SYSTEM

(71) Applicant: TOYOTA JIDOSHA KABUSHIKI KAISHA, Toyota (JP)

(72) Inventors: Hirotaka Komura, Nagakute (JP); Kunihiro Iwamoto, Nagakute (JP); Yutaro Takagi, Nagakute (JP); Yuta Itozawa, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 337 days.

(21) Appl. No.: 18/403,032

(22) Filed: Jan. 3, 2024

(65) Prior Publication Data

US 2024/0246799 A1 Jul. 25, 2024

(30) Foreign Application Priority Data

Jan. 20, 2023 (JP) ................................ 2023-007050

(51) Int. Cl.
*B66F 9/18* (2006.01)
*B66F 9/06* (2006.01)

(52) U.S. Cl.
CPC ................ *B66F 9/18* (2013.01); *B66F 9/063* (2013.01)

(58) Field of Classification Search
CPC ........... B60P 1/64; B60P 1/6418; B60P 1/649; B60P 1/6481; B60P 1/6427; B60P 1/6409; B62D 53/028; B62D 53/08; B62D 53/0842; B62D 53/12; B62D 53/065; B66F 9/12; B66F 9/18; B66F 9/186; B66F 9/063; B66F 9/065
USPC .......................................................... 414/498
See application file for complete search history.

(56) References Cited

U.S. PATENT DOCUMENTS

| | | | | |
|---|---|---|---|---|
| 10,908,601 | B2 * | 2/2021 | Diehr | B65G 1/1375 |
| 2006/0210382 | A1 * | 9/2006 | Mountz | B60P 1/64 414/498 |
| 2015/0117996 | A1 * | 4/2015 | Lavoie | B65D 88/123 414/541 |
| 2021/0155146 | A1 * | 5/2021 | Yabushita | B60P 7/0807 |
| 2022/0227435 | A1 * | 7/2022 | Moore | B62D 53/0821 |
| 2022/0259024 | A1 * | 8/2022 | Itozawa | B66F 9/18 |

FOREIGN PATENT DOCUMENTS

| | | |
|---|---|---|
| JP | H05-221516 A | 8/1993 |
| JP | 2017-017905 A | 1/2017 |
| JP | 2020-152557 A | 9/2020 |

OTHER PUBLICATIONS

Nov. 25, 2024 Office Action issued in Korean Patent Application No. 10-2022-7033923.

* cited by examiner

*Primary Examiner* — Glenn F Myers
(74) *Attorney, Agent, or Firm* — Oliff PLC

(57) ABSTRACT

A conveyance system capable of reducing the risk of damage to a connector provided in a conveyance vehicle is provided. A conveyance system according to an embodiment of the present disclosure includes a conveyance vehicle including a first connector, and a cargo bed including a second connector complementary to the first connector. The first connector is disposed on an upper surface of the conveyance vehicle with its connector surface facing downward. The second connector is disposed on a lower surface of the cargo bed with its connector surface facing upward.

2 Claims, 7 Drawing Sheets

CONVEYANCE SYSTEM

CROSS REFERENCE TO RELATED APPLICATIONS

This application is based upon and claims the benefit of priority from Japanese patent application No. 2023-007050, filed on Jan. 20, 2023, the disclosure of which is incorporated herein in its entirety by reference.

BACKGROUND

The present disclosure relates to a conveyance system.

In an unmanned conveyance vehicle disclosed in Japanese Unexamined Patent Application Publication No. H5-221516, a protrusion is formed at each of the four corners of a pedestal. A power transfer connector is provided in a hole of each of the protrusions. The upper part of each of the protrusion is formed in a cylindrical shape and the lower part thereof is shaped in a tapered shape in such a manner that the diameter increases downward. Recesses opposed to the protrusions are provided on a lower surface of a station, and the protrusions are engaged with (i.e., inserted into) the recesses, respectively.

SUMMARY

The connector of the unmanned conveyance vehicle disclosed in Patent Literature 1 is disposed so that its connector surface faces upward. Therefore, when the unmanned conveyance vehicle is not connected with the station, there is a risk that the connector of the unmanned conveyance vehicle may be damaged.

The present disclosure has been made in view of the above-described problem, and an object thereof is to provide a conveyance system capable of reducing the risk of damage to a connector provided in a conveyance vehicle.

A conveyance system according to an aspect of the present disclosure is a conveyance system including a conveyance vehicle including a first connector, and a cargo bed including a second connector complementary to the first connector, in which the first connector is disposed on an upper surface of the conveyance vehicle with its connector surface facing downward, and the second connector is disposed on a lower surface of the cargo bed with its connector surface facing upward.

According to the present disclosure, it is possible to provide a conveyance system capable of reducing the risk of damage to a connector provided in a conveyance vehicle.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

A specific embodiment to which the present disclosure is applied will be described hereinafter in detail with reference to the drawings. However, the present disclosure is not limited to the below-shown embodiment. Further, for clarifying the explanation, the following description and drawings are simplified as appropriate.

First Embodiment

Figure 1:
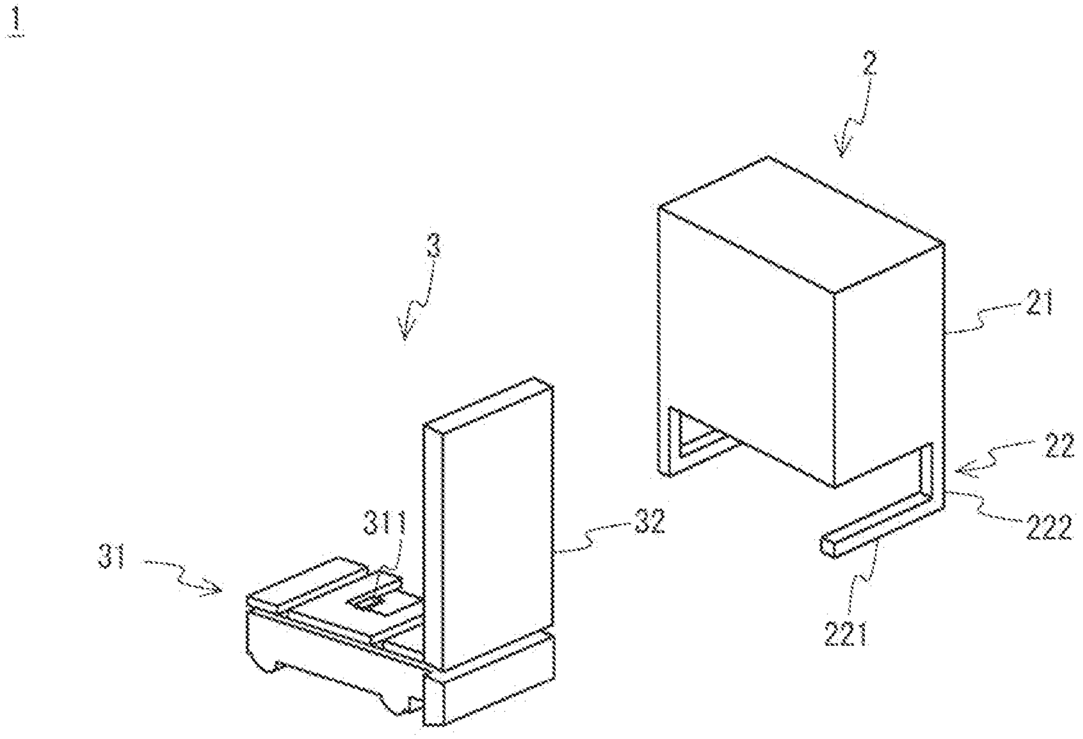
FIG. 1 is a diagram for explaining a configuration of a conveyance system according to a first embodiment.

A conveyance system according to a first embodiment will be described hereinafter with reference to the drawings. FIG. 1 is a diagram for explaining a configuration of a conveyance system 1 according to the first embodiment. The conveyance system 1 includes a cargo bed 2 and a conveyance vehicle 3. The conveyance vehicle 3 may be an unmanned conveyance vehicle.

The cargo bed 2 includes an accommodation part 21 and a pair of leg parts 22. A cargo or the like is accommodated in the accommodation part 21.

Figure 2:
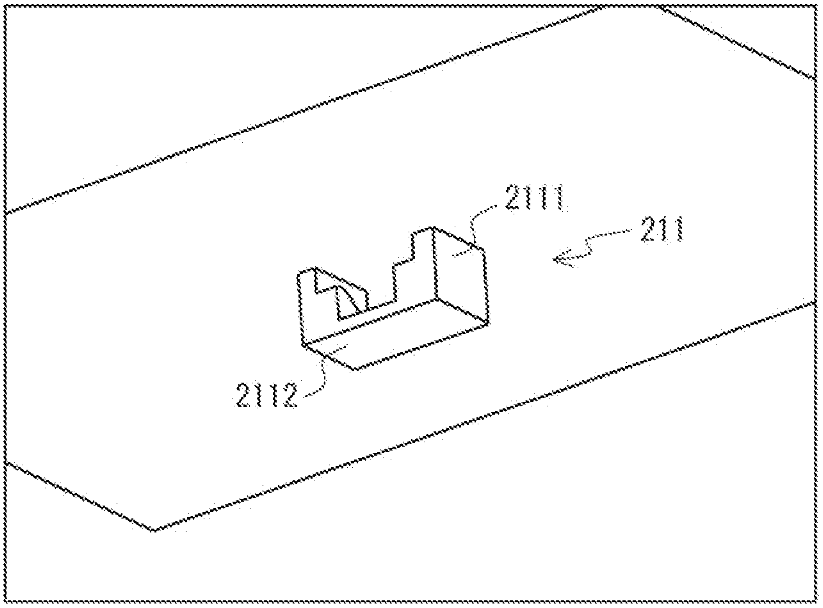
FIG. 2 is a diagram for explaining a configuration of a lower surface of a cargo bed according to the first embodiment.

FIG. 2 is a diagram for explaining a configuration of the lower surface of the accommodation part 21. The lower surface of the accommodation part 21 is also referred to as the lower surface of the cargo bed 2. A protrusion 211 protruding downward is provided on the lower surface of the accommodation part 21. The protrusion 211 includes a pair of side plates 2111 vertically extending from the lower surface and a lower plate 2112 connecting the lower ends of the pair of side plates 2111. A second connector (not shown) is provided on the upper surface of the lower plate 2112. The connector surface of the second connector faces upward. Further, an inclination (which will be described later) is provided in each of the side plate 2111. When a first connector (which will be described later) is guided by the inclinations, the first connector is connected to the second connector.

The first and second connectors may be audio/video connectors, power supply connectors, or communication connectors. For example, electric power may be supplied from the conveyance vehicle 3 to the cargo bed 2 through the first and second connectors. Further, in the case where a display is provided on the side surface of the cargo bed 2, video information to be displayed on the display may be transmitted from the conveyance vehicle 3 to the cargo bed 2 through the first and second connectors.

Referring to FIG. 1 again, each leg part 22 includes a horizontally extending bar 221 and a vertically extending pole 222. One end of the bar 221 is connected to the lower surface of the accommodation part 21 through the pole 222. A wheel(s) may be provided below the bar 221.

A first direction toward which the gap between the lower surface of the accommodation part 21 and the first leg part 22 is opened is opposite to a second direction toward which the gap between the lower surface of the accommodation part 21 and the second leg part 22 is opened. The conveyance vehicle 3 can move into a space under the accommodation part 21 in the first direction or move into the space under the accommodation part 21 in the second direction.

The conveyance vehicle 3 includes a body part 31. The body part 31 is a housing for containing at least some of apparatuses and the like required for the conveyance vehicle 3 (e.g., a processor and an actuator). A plate 32 extending in the vertical direction is vertically provided at the end of the body part 31. A sensor(s) (not shown) may be attached to the plate 32.

Further, a wheel(s) (not shown) is rotatably provided below the body part 31. By having an actuator such as a motor rotate the wheel according to a control signal from the processor, the conveyance vehicle 3 moves to an arbitrary place.

The thickness of the body part 31 is smaller than the gap between the lower surface of the accommodation part 21 and the leg part 22. As the conveyance vehicle 3 moves in the direction in which the bar 221 extends, the conveyance vehicle 3 can move into the gap between the lower surface of the accommodation part 21 and the leg part 22.

A drive mechanism (not shown) for lifting the cargo bed 2 is provided at each of the four corners on the upper surface of the body part 31. For example, a protrusion may be provided at each of the four corners, and the protrusions may be configured so that their heights can be changed. Further, the drive mechanism may also have a function of moving the cargo bed 2 in the horizontal direction.

Figure 3:
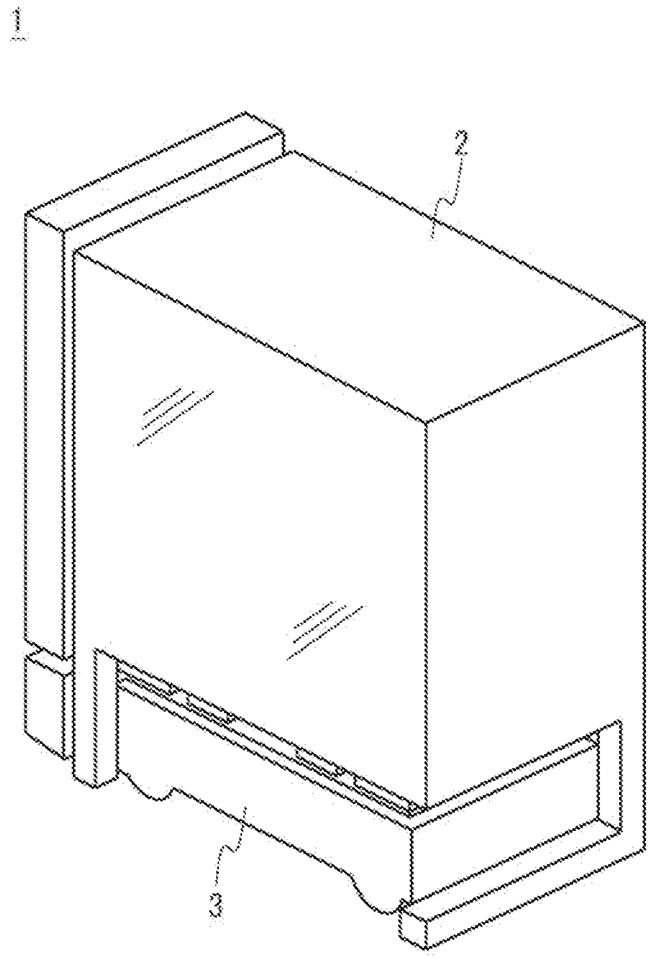
FIG. 3 is a diagram for explaining a state in which a conveyance vehicle is connected with a cargo bed according to the first embodiment.

The conveyance vehicle 3 moves into the gap between the lower surface of the accommodation part 21 and the leg part 22, and then the conveyance vehicle 3 lifts the cargo bed 2, so that the conveyance vehicle 3 is connected to the cargo bed 2. FIG. 3 is a diagram for explaining a state in which the conveyance vehicle 3 is connected with the cargo bed 2. In this state, the second connector of the cargo bed 2 is connected with the first connector of the conveyance vehicle 3 (which will be described later).

Referring to FIG. 1 again, the conveyance vehicle 3 has a processor, a memory, and the like (not shown). The conveyance vehicle 3 is connected to the cargo bed 2 according to a control signal from the processor. As the conveyance vehicle 3, which has been connected with the cargo bed 2, travels, the conveyance system 1 transports a cargo or the like.

A first connector 311 is provided on the upper surface of the body part 31. The first connector 311 is a connector complementary to the second connector provided in the cargo bed 2. The connector surface of the first connector 311 faces downward.

Figure 4:
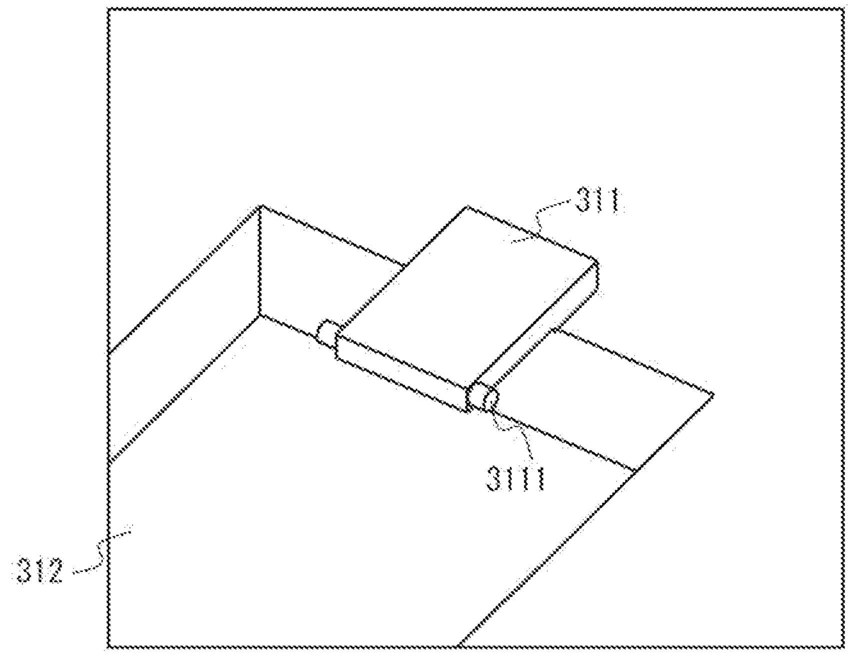
FIG. 4 is a diagram for explaining a configuration of an upper surface of a conveyance vehicle according to the first embodiment.

FIG. 4 is a diagram for explaining a configuration of the first connector 311. A groove 312 is formed below the first connector 311. When the cargo bed 2 is connected to the conveyance vehicle 3, the protrusion 211 of the cargo bed 2 enters (i.e., is inserted into) the groove 312. The connector surface of the first connector 311 faces downward. Rollers 3111 are provided on both sides of the first connector 311.

Figure 5:
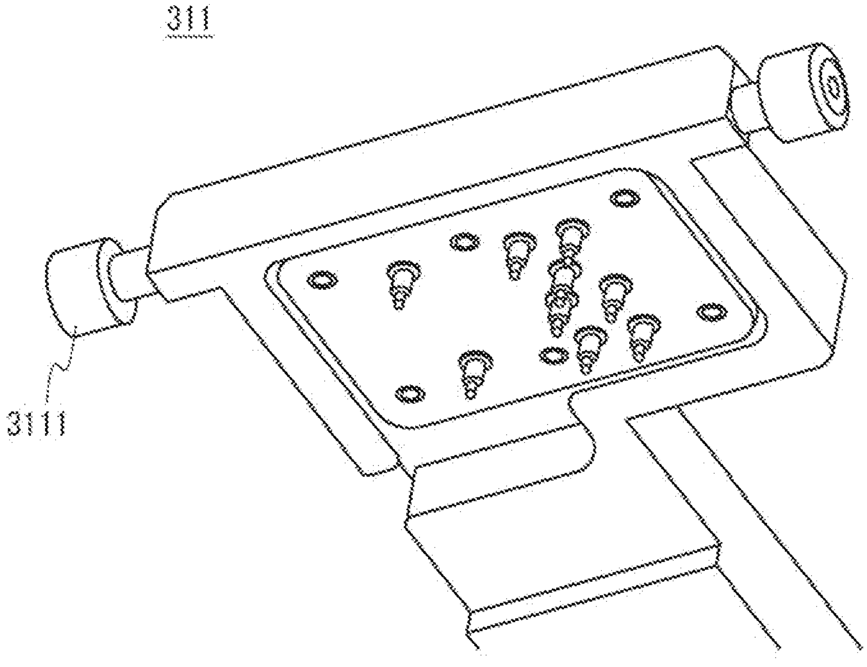
FIG. 5 is a diagram for explaining a configuration of a first connector according to the first embodiment.

FIG. 5 is a diagram for explaining the connector surface of the first connector 311. The first connector 311 is a pin-type connector, and each pin (e.g., a pogo pin) faces (i.e., projects) downward. Each pin faces (i.e., projects) toward the body part 31 and is not exposed. Note that the first connector 311 may be a socket-type connector.

Figure 6:
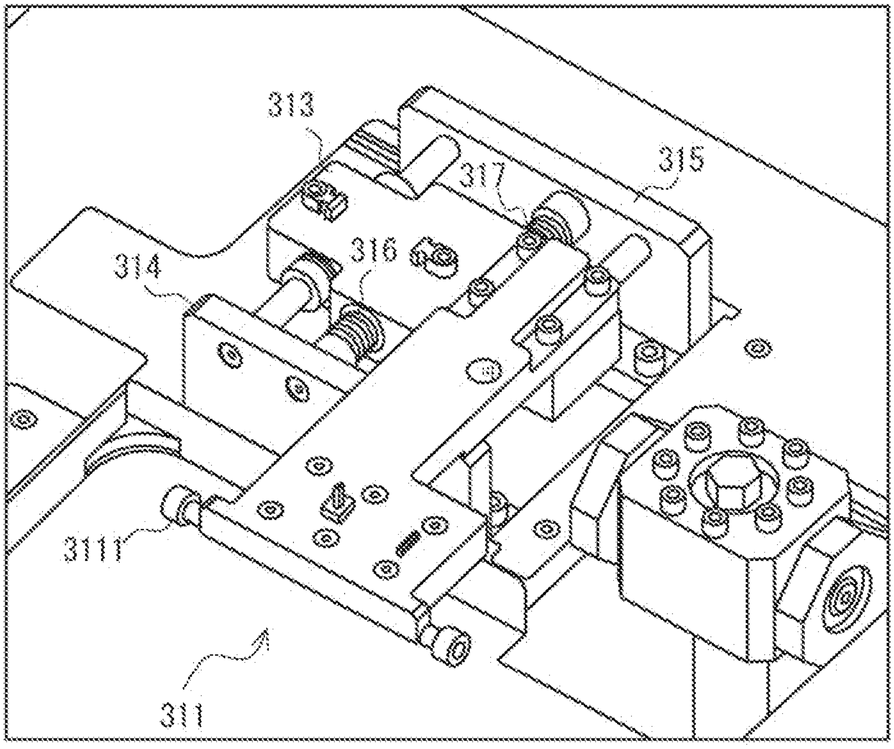
FIG. 6 is a diagram for explaining a configuration of the first connector according to the first embodiment.

FIG. 6 is a diagram for explaining a structure of the rear surface of the first connector 311. The first connector 311 is attached to a movable part 313. The movable part 313 is disposed between a plate 314 and a plate 315. Each of the plates 314 and 315 vertically extends from the upper surface of the body part 31. The movable part 313 is connected with the plate 314 by a spring 316, and the movable part 313 is connected with the plate 315 by a spring 317. That is, the first connector 311 is in a floating state by the springs 316 and 317.

Next, a configuration of the second connector 212 provided in the cargo bed 2 will be described with reference to FIG. 7. A first terminal pattern 2121 and a second terminal pattern 2122 are arranged on the same plane. The second connector 212 is a socket-type connector. In the case where the first connector 311 is a socket-type connector, the second connector 212 may be a pin-type connector. Depending on in which direction the conveyance vehicle 3 moves into space under the cargo bed 2, the first connector 311 is connected to either the first terminal pattern 2121 or the second terminal pattern 2122.

Each of the first and second terminal patterns 2121 and 2122 corresponds to the terminal pattern of the first connector 311. The second terminal pattern 2122 is disposed in point symmetry with the first terminal pattern 2121 with respect to the center of the plane. That is, when the first terminal pattern 2121 is rotated about the vertical axis by 180 degrees, the orientations of the first and second terminal patterns 2121 and 2122 coincide with each other. The first and second connectors 311 and 212 are connected to each other irrespective of in which direction the conveyance vehicle 3 has moved into space under the cargo bed 2.

Two inclinations 2123 are provided on the connector surface of the second connector 212. The two inclinations 2123 guide rollers 3111 so that the first connector 311 is connected to the first terminal pattern 2121 or to the second terminal pattern 2122 depending on the direction in which the conveyance vehicle 3 moves into space under the cargo bed 2. Each of the inclinations 2123 is lowered (i.e., extends obliquely downward) toward the center point. The inclination directions of the two inclinations 2123 are opposite to each other.

Figure 7:
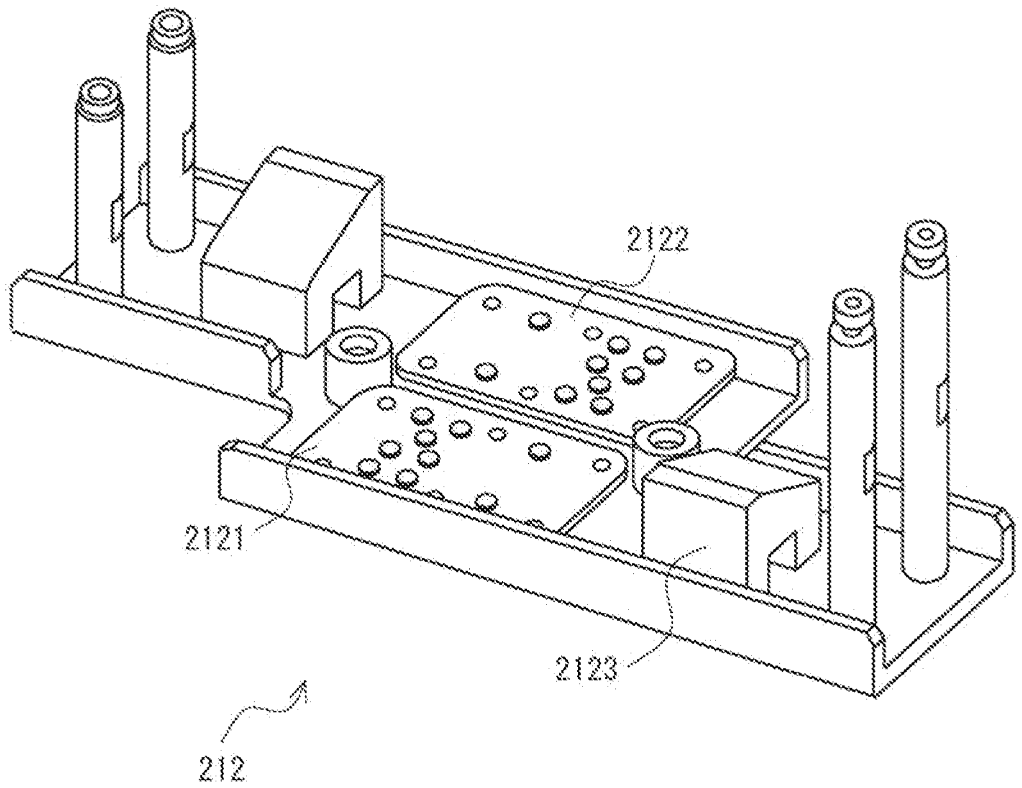
FIG. 7 is a diagram for explaining a configuration of a second connector according to the first embodiment.

As shown in FIG. 7, the two inclinations 2123 are provided in point symmetry with each other with respect to the center point. Since the rollers 3111 are provided on both sides of the first connector 311, there is no need to provide inclinations 2123 on both sides of each of the first and second terminal patterns 2121 and 2122.

As described above, the first connector 311 is in the floating state by the springs. When the conveyance vehicle 3 lifts the cargo bed 2, the rollers 3111 of the first connector 311 are guided by the inclinations 2123. In this way, the terminal pattern of the first connector 311 is connected to the first terminal pattern 2121 or to the second terminal pattern 2122.

In the conveyance system according to the first embodiment, since the connector surface of the first connector provided in the conveyance vehicle is not exposed, the risk of damage to the first connector provided in the conveyance vehicle can be reduced. Further, the position of the first connector can be accurately determined by using the rollers and the inclinations.

The above-described program includes instructions (or software codes) that, when loaded into a computer, cause the computer to perform one or more of the functions. The program may be stored in a non-transitory computer readable medium or a tangible storage medium. By way of example, and not a limitation, the non-transitory computer readable media or tangible storage media can include a RAM (Random-Access Memory), a ROM (Read-Only Memory), a flash memory, an SSD (Solid-State Drive) or other types of memory technologies, a CD-ROM, a DVD (Digital Versatile Disc), a Blu-ray (Registered Trademark)

disc or other types of optical disc storage, and magnetic cassettes, magnetic tape, magnetic disk storage or other types of magnetic storage devices. The program may be transmitted on a transitory computer readable medium or a communication medium. By way of example, and not a limitation, the transitory computer readable media or communication media can include electrical, optical, acoustical, or other forms of propagation signals.

Note that the present disclosure is not limited to the above-described embodiments, and they may be modified as appropriate without departing from the scope and spirit of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A conveyance system comprising a conveyance vehicle comprising a first connector, and a cargo bed comprising a second connector complementary to the first connector, wherein the first connector is disposed on an upper surface of the conveyance vehicle with its connector surface facing downward, the second connector is disposed on a lower surface of the cargo bed with its connector surface facing upward, the second connector includes two terminal patterns arranged on the same plane, one of the terminal patterns is disposed in point symmetry with the other terminal pattern with respect to a center point on the plane, rollers are provided on both sides of the first connector, and inclinations for guiding rollers are provided in the second connector so that the first connector is connected to one of the terminal patterns or the other terminal pattern depending on a direction in which the conveyance vehicle moves into space under the cargo bed.

2. The conveyance system according to claim 1, wherein the first connector is a pin-type connector and the second connector is a socket-type connector, or the first connector is a socket-type connector, and the second connector is a pin-type connector.

* * * * *